Aug. 12, 1941.   C. E. HATHORN   2,252,286
COWL FASTENER
Filed Sept. 14, 1939

INVENTOR
CHARLES E. HATHORN.
BY
ATTORNEY

Patented Aug. 12, 1941

2,252,286

UNITED STATES PATENT OFFICE 2,252,286

COWL FASTENER

Charles E. Hathorn, Kenmore, N. Y., assignor to Curtiss-Wright Corporation, a corporation of Delaware Application September 14, 1939, Serial No. 294,817

2 Claims. (Cl. 24—221)

This invention relates to cowl fasteners, the devices of the invention being particularly applicable to aircraft cowling and inspection plates which must be readily removable, but which must be secure when assembled.

A particular object of the invention is to provide a fastener assembly of simple construction which may be readily manufactured at a low price which, at the same time, will provide for easy detachment, and which will provide a flush exterior surface.

Further objects will be apparent from a reading of the annexed specification and claims, together with an examination of the accompanying drawing, in which:

Figure 1:
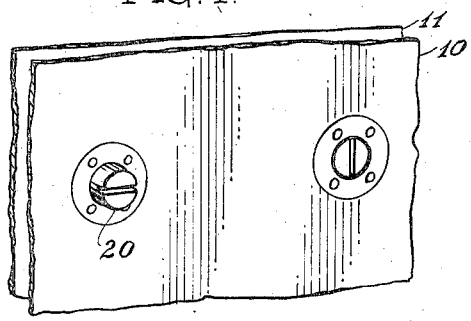
Fig. 1 shows a pair of plates embodying the invention.
Figure 2:
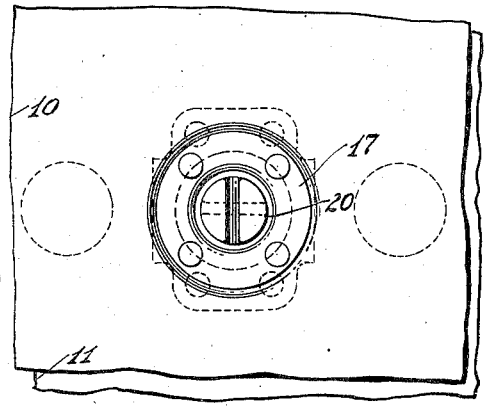
Fig. 2 is a plan of a plate incorporating the cowl fastener.

A plate 10 is adapted to overlie and be secured to a plate 11, the two plates having aligned holes 13 and 14, the plate adjacent to the hole 13 being countersunk slightly as at 15. A cup element 16 is inserted through the hole 13, this cup having an outwardly extending flange 17 lying in the depression 15, and having an inwardly projecting flange 18 at its lower or inner end. In the cup, a mandrel 19 is disposed, said mandrel having a screw head 20 adjacent the plane of the plate 10, and a bulbous portion 21 at its lower end, the latter projecting beyond the cup flange 18. A compression spring 22 is disposed between the head 20 and the flange 18, urging the bulbous portion 21 toward the plate 10. Said bulbous portion has opposed cutouts which form barbs 24.

Figure 3:
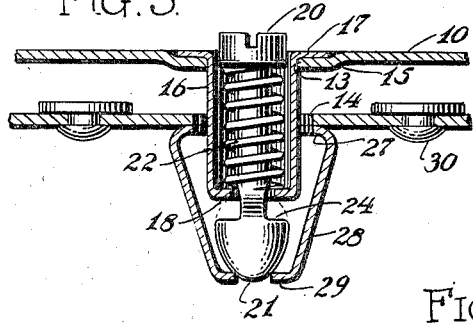
Figs. 3 and 4 are sections through plates joined by the fastener respectively in the assembly and secured positions.
Figure 4:
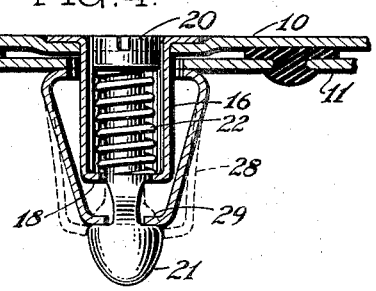
Figure 5:
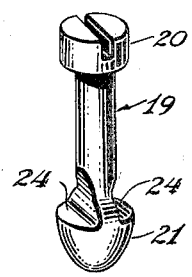
Fig. 5 is a perspective view of one of the elements of the fastener.
Figure 6:
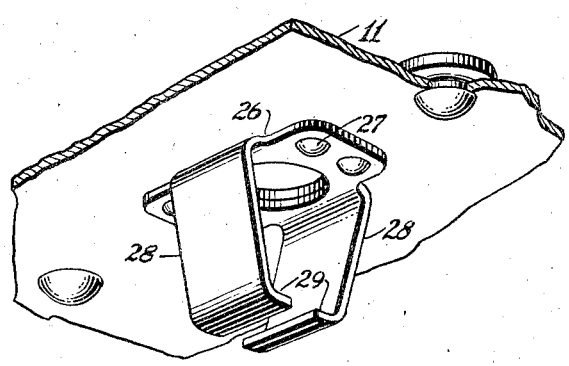
Fig. 6 is a perspective view of a plate to which is secured another element of the fastener.

The plate 11 carries a spring element 26 comprising a base secured to the plate 11 as by rivets 27, said base having a hole aligned with and of the same size as the hole 14, and having inwardly projecting integral arms 28, the innermost ends of which arms are inturned as at 29 to form elements which engage within the barb notches 24 when the plate 10 is assembled over the plate 11 and when the mandrel 19 is pressed inwardly. Fig. 3 shows the position of the elements when the plate 10 is first assembled over the plate 11. Fig. 4 shows, in dotted lines, the spreading of the arms 28 by the bulb 21 as the mandrel is pressed inwardly. When the bulb passes beyond the inturned spring arm portions 29, the latter spring inwardly, into the barb recesses, to secure the plates 10 and 11 from spreading. To unlock the assembly, it is merely necessary to turn the mandrel 19 by means of a screwdriver, whereby the portions 29 are cammed apart to disengage the barbs 24, whereupon the plate 10 with its attached parts may be lifted clear of the plate 11.

The figures show rubber pads 30 secured to the plate 11 against which the plate 10 may rest when in assembled position. The spring 22 serves to resiliently hold the parts in assembled relation, and it will be noted that considerable clearance may be provided in the hole 14 without affecting proper locking of the mechanism so that the plates 10 and 11 may be moved around slightly with respect to one another avoiding the necessity of absolutely perfect alignment of the plates when they are placed together.

Figure 7:
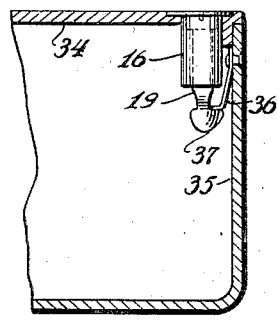
Fig. 7 is a section through a box incorporating an alternative embodiment.

Fig. 7 shows an alternative arrangement in which the cup 16 with its mandrel 19 is secured to a box cover 34. The side of the box 35 over which the cover fits, is provided with a spring arm 36 having an end portion 37 turned in for engagement by the mandrel 19 and the barb 24 thereof.

Various changes in the form of the spring arm element may be made, and changes may be made also in the mode by which the mandrel 19 is secured to the plate 10, such changes including the substitution of other resilient means for the spring 22. Likewise, the barb head of the mandrel is susceptible to various modifications to accommodate it to different modes of fabrication.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a fastening assembly, an inner plate having an opening, inwardly projecting oblique spring prongs extending from the plate, the innermost ends thereof being bent toward the opening axis and to a position substantially parallel with the plate; an outer plate overlying the inner plate having an inwardly projecting open end cup passing through the inner plate opening, a mandrel passing through and axially movable and rotatable relative to the cup, provided with turning and pressing means at its outer end and provided with an enlarged tapered inner head end adapted, when pressed inwardly, to pass between the prong ends, said mandrel head at a short distance from the inner mandrel end having opposed notches formed therein, the notch surfaces adjacent the inner mandrel end being plane and substantially parallel to the inner plate and the notch surfaces toward the outer mandrel end being sloped, said notches being engageable by the prong inner ends to prevent withdrawal of the mandrel therefrom, and a spring embracing the mandrel disposed within said cup, one spring end bearing on the cup inner end and the other spring end bearing on the outer mandrel end, said enlarged inner end of the mandrel being engageable with the inner cup end to prevent withdrawal of the mandrel through the cup.

2. In a fastening assembly, an outer plate having an open-end cup therein, a mandrel having enlarged ends and a shank of smaller diameter, the shank passing through said cup but the enlarged ends being larger than the cup opening, a spring embracing the shank bearing at one end on the cup and at its other end on the outer enlarged end, tending to urge the inner enlarged end toward the plate, said inner enlarged end being tapered and having opposed notches therein comprising surfaces facing and substantially parallel to said plate, an inner plate having an opening through which said mandrel and cup passes, and oblique spring prongs secured to the inner plate on opposite sides of the opening, the inner ends of said prongs being bent toward the opening axis and lying substantially parallel to said plates, said prong inner ends being separable by passage of the tapered mandrel end therebetween and being engageable with said notches upon inward pressing of the mandrel against the action of said spring, said prong ends being separable from the mandrel notches by mandrel rotation.

CHARLES E. HATHORN.